(12) United States Patent
Khayyer

(10) Patent No.: US 11,731,648 B2
(45) Date of Patent: Aug. 22, 2023

(54) VEHICLE LATERAL—CONTROL SYSTEM WITH DYNAMICALLY ADJUSTABLE CALIBRATIONS

(71) Applicant: Aptiv Technologies Limited, St. Michael (BB)

(72) Inventor: Pardis Khayyer, Carmel, IN (US)

(73) Assignee: Aptiv Technologies Limited, St. Michael (BB)

( * ) Notice: Subject to any disclaimer, the term of this patent is extended or adjusted under 35 U.S.C. 154(b) by 178 days.

(21) Appl. No.: 17/180,546

(22) Filed: Feb. 19, 2021

(65) Prior Publication Data

US 2022/0266852 A1 Aug. 25, 2022

(51) Int. Cl.
*B60W 60/00* (2020.01)
*H04W 4/029* (2018.01)
(Continued)

(52) U.S. Cl.
CPC .......... *B60W 60/001* (2020.02); *B60W 40/08* (2013.01); *G01C 21/3691* (2013.01);
(Continued)

(58) Field of Classification Search
CPC . B60W 2050/0031; B60W 2050/0088; B60W 2050/0091; B60W 2420/42;
(Continued)

(56) References Cited

U.S. PATENT DOCUMENTS 9,576,489 B2 * 2/2017 Park ...................... B60W 40/04
9,934,688 B2 * 4/2018 Olson ................... B60W 30/08
(Continued)

FOREIGN PATENT DOCUMENTS

DE 102017125729 A1 5/2019
EP 3659889 A1 * 6/2020 ............ B60W 10/04
(Continued)

OTHER PUBLICATIONS

Hatipoglu, "Automated Lane Change: Theory and Practice", Mar. 1998, pp. 73-78.
(Continued)

*Primary Examiner* — Babar Sarwar
(74) *Attorney, Agent, or Firm* — Sawtooth Patent Group PLLC

(57) ABSTRACT

The techniques of this disclosure relate to a vehicle lateral-control system with dynamically adjustable calibrations. The system includes a controller circuit that receives weather data for a geographic region traveled by a vehicle. The controller circuit receives image data from a camera of a roadway traveled by the vehicle in the geographic region. The controller circuit receives vehicle-state data from one or more vehicle sensors indicating an operating condition of the vehicle on the roadway in the geographic region. The controller circuit adjusts a calibration of vehicle lateral-control features based on the weather data, the image data, and the vehicle-state data. The controller circuit operates the vehicle on the roadway based on the adjusted calibration. The system can increase passenger comfort or reduce an error from a lane centerline when the vehicle is operated in an autonomous-driving mode, which can improve operational safety.

20 Claims, 8 Drawing Sheets

(51) Int. Cl.
*G06V 20/56* (2022.01)
*B60W 40/08* (2012.01)
*G01C 21/36* (2006.01)

(52) U.S. Cl.
CPC .......... *G06V 20/588* (2022.01); *H04W 4/029* (2018.02); *B60W 2552/30* (2020.02); *B60W 2552/53* (2020.02)

(58) Field of Classification Search
CPC ........ B60W 2520/10; B60W 2530/10; B60W 2530/20; B60W 2552/30; B60W 2552/53; B60W 2555/20; B60W 30/02; B60W 30/10; B60W 30/12; B60W 40/08; B60W 50/0097; B60W 60/001; B60W 2420/52; B60W 30/00; B60W 30/18154; G01C 21/3691; G06V 20/588; G06V 10/764; G06V 10/82; H04W 4/029; B62D 15/02; B62D 15/025; B62D 15/0255; G05D 1/0088; G05D 1/0221; G05D 2201/0213; G06N 20/00; G06N 3/08; G06N 3/045
See application file for complete search history.

(56) References Cited

U.S. PATENT DOCUMENTS

| | | | | |
|---|---|---|---|---|
| 10,073,459 | B2 * | 9/2018 | Raghu | B60W 30/143 |
| 10,479,375 | B2 * | 11/2019 | Towal | G05D 1/0027 |
| 11,427,226 | B1 * | 8/2022 | Iglesias | B60W 60/0053 |
| 11,608,080 | B2 * | 3/2023 | Oltmann | B60W 60/0015 |
| 2012/0283911 | A1 * | 11/2012 | Lee | B60W 30/12 701/41 |
| 2019/0212749 | A1 * | 7/2019 | Chen | G06N 20/00 |
| 2020/0172117 | A1 * | 6/2020 | Zhu | B60W 50/00 |
| 2021/0188256 | A1 * | 6/2021 | Hoedt | B60W 50/00 |

FOREIGN PATENT DOCUMENTS

| | | | | |
|---|---|---|---|---|
| GB | 2555617 A | | 5/2018 | |
| WO | WO-2019086518 A1 * | | 5/2019 | B60W 30/08 |

OTHER PUBLICATIONS

Ho, et al., "Lane Change Algorithm for Autonomous Vehicles via Virtual Curvature Method", Oct. 2007, pp. 47-70.

Matute, et al., "Experience Validation of a Kinematic Bicycle Model Predictive Control with Lateral Acceleration Consideration", Jul. 2019, pp. 289-294.

Seborg, et al., "Model Predictive Control", Chapter 20, Process Dynamics and Control, Wiley 2011, pp. 416-438.

Snider, "Automatic Steering Methods for Autonomous Automobile Path Tracking", Feb. 2009, 78 pages.

Zhao, et al., "Lateral Control of Autonomous Vehicles Using Multi-Model and Fuzzy Approaches", Jun. 2010, 7 pages.

"Extended European Search Report", EP Application No. 22150015.0, dated Jul. 1, 2022, 10 pages.

* cited by examiner

DYNAMIC BYCICLE MODEL

| CALIBRATION | WIND (PRIMARY IMPORTANCE) | ROAD CONDITION (SECONDARY IMPORTANCE) | AMBIENT LIGHTING (TERTIARY IMPORTANCE) |
|---|---|---|---|
| LATERAL TUNING 1 | NE | ICE | DIRECT SUN |
| LATERAL TUNING 2 | NE | RAIN | NIGHT |
| LATERAL TUNING 3 | NW | RAIN | CLOUDY |
| LATERAL TUNING 4 | S | DRY | CLOUDY |
| LATERAL TUNING 5 | SW | DRY | DIRECT SUN |
| ... | ... | ... | ... |
| LATERAL TUNING N | | | |

FIG. 7

VEHICLE LATERAL—CONTROL SYSTEM WITH DYNAMICALLY ADJUSTABLE CALIBRATIONS

BACKGROUND

A Society of Automotive Engineers (SAE) Level 2 automated-driving system includes driver-assistance features that provide steering, braking, and acceleration assistance, for example, automatic lane-change and lane-centering. Vehicles equipped with Level 2 automated-driving systems require a human driver to be poised to take control of the vehicle in the event the automated-driving system relinquishes control. Factory settings of the driver-assistance features are typically calibrated based on a compromise between various weather conditions, road conditions, and vehicle operating conditions. During vehicle-handling development, a calibration engineer may operate the vehicle under varying weather and vehicle-states and select one set of calibration values that, on average, meets the overall vehicle-handling requirements. However, this set of calibration values may not be the ideal calibration for a specific driving condition. Some drivers may consider the factory-set calibrations to feel unnatural, too aggressive for the weather or road conditions, or not aggressive enough for their liking. As a result, some drivers may deactivate the automated-driving mode, which can lead to reduced vehicle safety.

SUMMARY

This document describes one or more aspects of a vehicle lateral-control system with dynamically adjustable calibrations. In one example, the system includes a controller circuit configured to receive, from one or more weather information sources, weather data for a geographic region traveled by a vehicle. The controller circuit receives, from a camera, image data of a roadway traveled by the vehicle in the geographic region. The controller circuit receives, from one or more vehicle sensors, vehicle-state data indicating an operating condition of the vehicle on the roadway in the geographic region. The controller circuit adjusts, based on one or more of the weather data, the image data, and the vehicle-state data, a calibration of one or more vehicle lateral-control features to increase passenger comfort or reduce an error from a lane centerline. The controller circuit operates the vehicle on the roadway based on the adjusted calibration.

In another example, a method includes receiving, with a controller circuit, weather data from one or more weather information sources for a geographic region traveled by a vehicle; receiving, with the controller circuit, image data from a camera of a roadway traveled by the vehicle in the geographic region; receiving, with the controller circuit, vehicle-state data from one or more vehicle sensors indicating an operating condition of the vehicle on the roadway in the geographic region; adjusting, with the controller circuit based on one or more of the weather data, the image data, and the vehicle-state data, a calibration of one or more vehicle lateral-control features to increase passenger comfort or reduce an error from a lane centerline; and operating the vehicle on the roadway, with the controller circuit, based on the adjusted calibration.

This summary is provided to introduce aspects of a vehicle lateral-control system with dynamically adjustable calibrations, which is further described below in the Detailed Description and Drawings. For ease of description, the disclosure focuses on vehicle-based or automotive-based systems, such as those that are integrated on vehicles traveling on a roadway. However, the techniques and systems described herein are not limited to vehicle or automotive contexts but also apply to other environments where sensors can be used to determine dynamics of a moving body. This summary is not intended to identify essential features of the claimed subject matter, nor is it intended for use in determining the scope of the claimed subject matter.

BRIEF DESCRIPTION OF THE DRAWINGS

The details of one or more aspects of a vehicle lateral-control system with dynamically adjustable calibrations are described in this document with reference to the following drawings. The same numbers are used throughout the drawings to reference like features and components:

FIG. 7 illustrates example calibrations with associated combined attributes for the vehicle lateral-control system with dynamically adjustable calibrations of FIG. 1

DETAILED DESCRIPTION

Overview

The techniques of this disclosure relate to a vehicle lateral-control system with dynamically adjustable calibrations. A controller circuit receives data from weather sources and vehicle-mounted cameras that indicate weather and road condition in a geographic region traveled by a vehicle. The controller circuit also receives data from vehicle sensors that indicate a vehicle state or current operating conditions of the vehicle while traveling on a roadway in the geographic region. The system adjusts a calibration of lateral-control features of the vehicle, for example, an automatic lane-change and a lane-centering, based on the driving conditions and the vehicle operating conditions. The system can operate the vehicle in an autonomous-driving mode using the adjusted lateral-control calibration and dynamically adjust the calibration as the weather, road conditions, and vehicle operating conditions change along the roadway. In this way, the vehicle lateral-control system with dynamically adjustable parameters can improve vehicle handling, resulting in driver or passenger comfort, and can reduce errors in a vehicle position within a lane of the roadway when the vehicle is operating in the autonomous-driving mode, which may enhance public perception of autonomous- and semi-autonomous-driving systems as the lateral-control system causes the vehicle to operate more-accurately on the roadway resulting in improved user experiences and operational safety.

Example System

Figure 1:
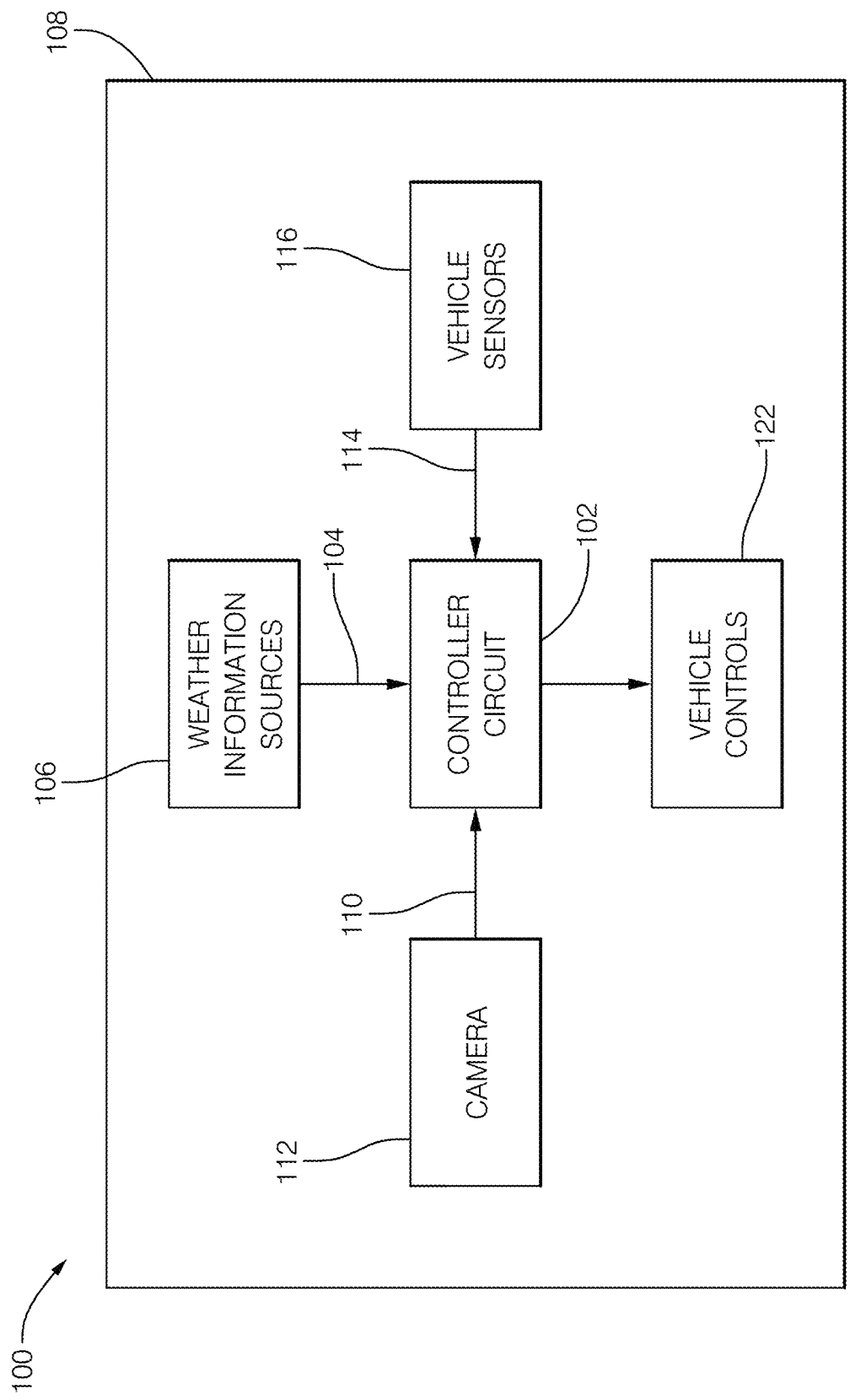
FIG. 1 illustrates an example of a vehicle lateral-control system with dynamically adjustable calibrations shown mounted on a vehicle, in accordance with techniques of this disclosure.

FIG. 1 illustrates an example of a vehicle lateral-control system 100 with dynamically adjustable calibrations, hereafter referred to as the system 100. The system 100 includes a controller circuit 102 that receives weather data 104 from one or more weather information sources 106 for a geographic region traveled by a vehicle 108. The weather information sources 106 can include multiple sources of weather data 104 that are received by the controller circuit 102 from external sources or detected by sensors on the vehicle 108, as will be described in more detail below.

From a camera 112, the controller circuit 102 also receives image data 110 of a roadway traveled by the vehicle 108 in the geographic region. The camera 112 can be any camera 112 that is configured to capture images of the roadway, such as a camera that captures light in infrared or visual spectrums. The camera 112 can be a component of another vehicle system, for example, a component of an advanced driver-assistance system (ADAS) that can detect lane markings, lane boundaries, or objects proximate to the vehicle 108. The lane markings or lane boundaries can be used by the controller circuit 102 to determine a path or trajectory of the vehicle, as will be explained in more detail below. In some examples, the camera 112 can be used as one of the weather information sources 106. The camera 112 can be a video camera 112 that captures images of the roadway traveled by the vehicle 108 or objects proximate to the vehicle 108. The controller circuit 102 can classify the objects in the images using software to identify the objects.

The controller circuit 102 also receives vehicle-state data 114 from one or more vehicle sensors 116, indicating an operating condition of the vehicle 108 on the roadway in the geographic region. The vehicle-state data 114 can include data for current vehicle operating conditions that have a significant impact on a dynamic response of the vehicle, based on a known vehicle dynamic model, as will be described in more detail below. Examples of the vehicle-state data include a vehicle mass, a vehicle velocity, tire pressure, and vehicle yaw.

Based on the weather data 104, the image data 110, or the vehicle-state data 114, the controller circuit 102 can adjust a calibration of one or more vehicle lateral-control features 118 to increase passenger comfort or reduce an error from a lane centerline when operating the vehicle in the autonomous-driving mode. Examples of the vehicle-lateral control features 118 include the automatic lane-change and lane-keeping features. The controller circuit 102 can adjust the calibrations of the vehicle lateral-control features 118 by selecting lateral-tuning parameters 120 that can be interpreted by vehicle controls 122 to control the steering, braking, and acceleration of the vehicle 108. The selected lateral-tuning parameters, when associated with the detected driving conditions, can reduce a drift or lateral error of the vehicle 108, or can reduce a steering oscillation when the system 100 is controlling the vehicle 108 to a planned trajectory. This can be observed by as improved handling and comfort, which may improve safety in operating the vehicle 108.

Although the vehicle 108 can be any vehicle, for ease of description, the vehicle 108 is primarily described as being a self-driving automobile that is configured to operate in the autonomous-driving mode to assist the driver riding onboard the vehicle 108. The vehicle 108 can be capable of SAE Level 2 autonomous operation (as referred to in the Background) that assists the driver with steering, braking, and acceleration, while the driver monitors the operation of the vehicle 108 at all times from a driver's seat.

In the example illustrated in FIG. 1, the controller circuit 102 is installed on the vehicle 108 and is communicatively coupled to the weather information sources 106, the camera 112, the vehicle sensors 116, and the vehicle controls 122 via transmission links. The transmission links can be wired or wireless interfaces, for example, BLUETOOTH®, Wi-Fi®, near field communication (NFC), universal serial bus (USB), universal asynchronous receiver/transmitter (UART), or controller area network (CAN). In some examples, the controller circuit 102 receives data from other vehicle systems via a CAN bus (not shown), for example, an infotainment system, a navigation system, and a tire-pressure management system (TPMS).

Controller Circuit

The controller circuit 102 for the vehicle lateral-control system 100 with dynamically adjustable calibrations may be implemented as a microprocessor or other control circuitry such as analog and/or digital control circuitry. The control circuitry may include one or more application-specific integrated circuits (ASICs), field-programmable gate arrays (FPGAs) that are programmed to perform the techniques, or one or more general-purpose hardware processors programmed to perform the techniques pursuant to program instructions in firmware, memory, other storage, or a combination. The controller circuit 102 may also combine custom hard-wired logic, ASICs, or FPGAs with custom programming to perform the techniques. The controller circuit 102 may include a memory or storage media (not shown), including non-volatile memory, such as electrically erasable programmable read-only memory (EEPROM) for storing one or more routines, thresholds, and captured data. The EEPROM stores data and allows individual bytes to be erased and reprogrammed by applying programming signals. The controller circuit 102 may include other examples of non-volatile memory, such as flash memory, read-only memory (ROM), programmable read-only memory (PROM), and erasable programmable read-only memory (EPROM). The controller circuit 102 may include volatile memory (e.g., dynamic random-access memory (DRAM), static random-access memory (SRAM)). The controller circuit 102 can include one or more clocks or timers used to synchronize the control circuitry or determine an elapsed time of events. The one or more routines may be executed by the processor to perform steps for operating the vehicle 108 based on signals received by the controller circuit 102 from the weather information sources 106, the camera 112, and the vehicle sensors 116, as described herein.

Weather Information Sources

Figure 2:
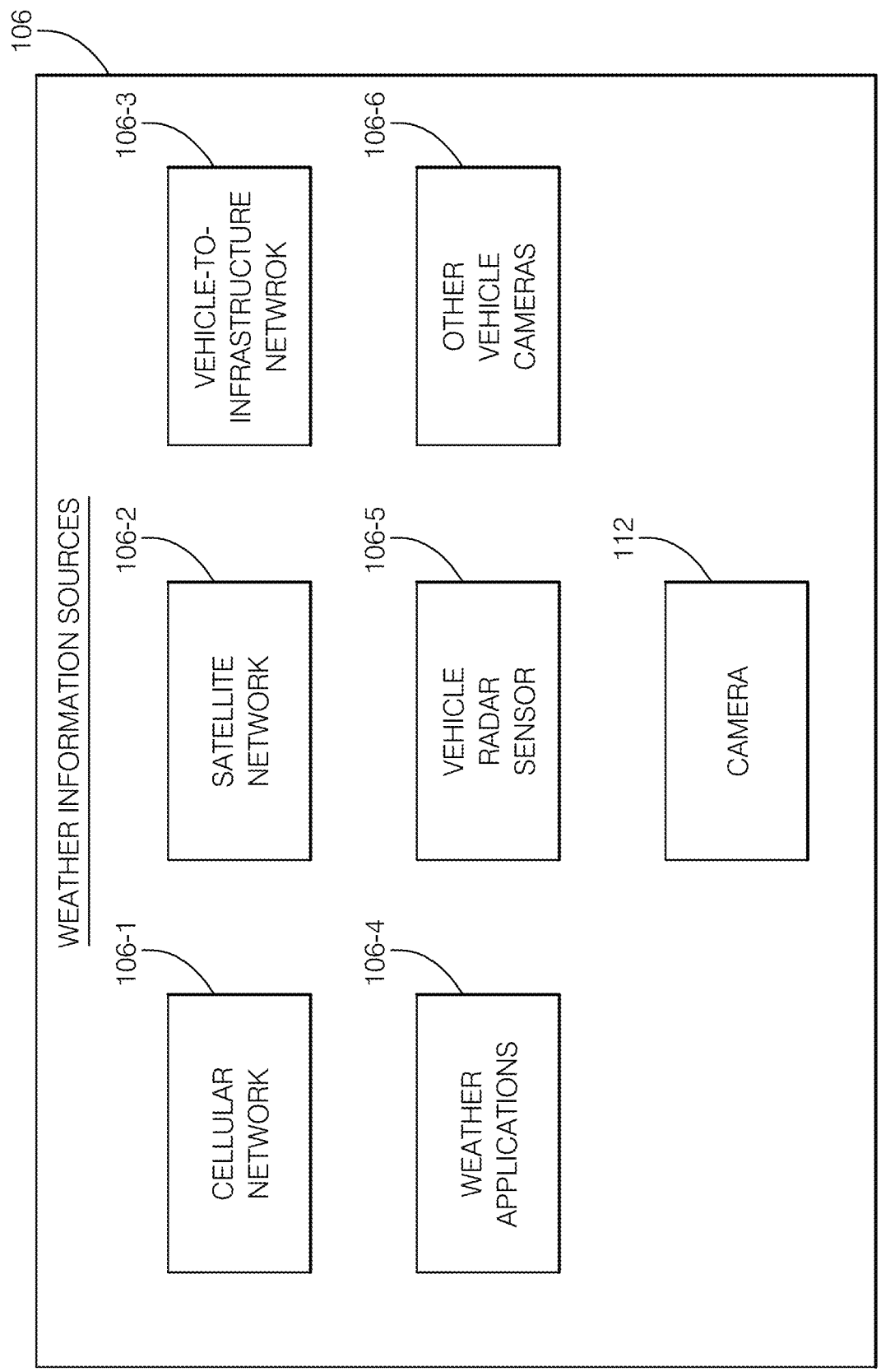
FIG. 2 illustrates example weather information sources isolated from the example of the vehicle lateral-control system with dynamically adjustable calibrations of FIG. 1.

FIG. 2 illustrates an example of the weather information sources 106 that are located remotely from the system 100. The weather information sources 106 can include a cellular network 106-1, a satellite network 106-2, a vehicle-to-infrastructure (V2I) network 106-3, weather applications 106-4, a vehicle radar sensor 106-5, other vehicle cameras 106-6, and the camera 112.

Real-time or near-real-time weather information for the region traveled by the vehicle 108 can be received by the controller circuit 102 via the cellular network 106-1 or via the satellite network 106-2. The controller circuit 102 can download regional weather data 104 via a cellular receiver or a satellite receiver that may be components of the infotainment system on the vehicle 108. The controller circuit 102 can download the weather data from weather services, for example, the National Weather Service (NWS) in the United States and National Meteorological Services of European Center for Medium-Range Weather Forecasts (ECMWF) member states in Europe. The weather data 104 can be in the form of General Regularly-distributed Information in Binary (GRIB) files that are typically used in meteorology. Known software or mobile applications can be used by the controller circuit 102 to interpret the GRIB files and extract the data used by the system 100.

The controller circuit 102 can download weather data 104 via the V2I network 106-3 that may be available in regions where Intelligent Transportation Systems (ITS) are deployed. The controller circuit 102 can receive the weather data 104 wirelessly from roadside units or nodes that collect traffic and weather conditions in the proximity of the vehicle 108. The V2I communication may use dedicated short-range communications (DSRC) that has a dedicated 75 megahertz (75 MHz) segment of a 5.9 gigahertz (5.9 GHz) band or may use cellular V2X (C-V2X) that uses 4G or 5G mobile cellular connectivity to send and receive signals from the nodes. The controller circuit 102 can also receive the weather data 104 from other vehicles traveling in the same region as the vehicle 108 via wireless vehicle-to-vehicle (V2V) transmissions that can use the DSRC communication protocol.

The controller circuit 102 can download weather data 104 via mobile weather applications 106-4 that provide a wide spectrum of weather data, for example, various government or private weather reporting services. The controller circuit 102 can use mobile weather applications 106-4 hosted by these reporting services and that provide specific weather data for the region traveled by the vehicle 108. The controller circuit 102 can extract specific weather information from the weather applications 106-4 using known data querying techniques, for example, wind speed and direction, temperature, or precipitation that can be used to adjust the calibrations of the lateral-control features, as will be described below.

The controller circuit 102 can use the vehicle radar sensor 106-5 to detect precipitation occurring around the vehicle 108 using filtering techniques to remove detected objects having relatively strong peaks and leaving signal components caused by rain clutter that may be considered background noise.

As some examples, the camera 112 can be a forward-facing two-dimensional (2D) camera or a 3D time-of-flight camera that measures a time for light pulses to leave the camera and reflect back on the camera's imaging array. Other types of cameras that generate 2D or 3D images may be used. During rain, sleet, or snow, the camera 112 may detect a type of precipitation occurring around the vehicle 108, and may detect precipitation on the roadway. In some examples, other vehicle cameras 106-6 can be used as the source of the weather data 104, for example, rear-facing cameras mounted to an exterior of the vehicle 108 that are used to provide a driver with a view behind the vehicle 108, or cameras mounted in side-mirror housings and front grills that, when used together, can provide a 360-degree view around the vehicle 108. If mounted inside the vehicle 108 with a view of the roadway through a windshield of the vehicle 108, the camera 112 can detect raindrops on the windshield based on photometric or light-scattering properties of raindrops and known image-processing techniques can be used by the controller circuit 102 to identify the raindrops. The controller circuit 102 can detect precipitation in the form of snow using known techniques of texture-based image-processing, for example, gray-level co-occurrence matrix (GLCM) and local binary pattern (LBP), along with known classification algorithms.

The controller circuit 102 can use machine learning to detect the various weather conditions. Machine learning is a data-analytics technique that teaches computers to learn from experience. Machine-learning routines, or algorithms, use computational methods to learn information from data without relying on a predetermined equation as a model. The routines improve their performance as the sample size available for learning increases. Machine learning uses two types of techniques: supervised learning, which trains a model on known input and output data so that it can predict future outputs, and unsupervised learning, which finds hidden patterns or intrinsic structures in input data.

Supervised learning uses classification and regression techniques to develop predictive models. Common algorithms for performing classification include support vector machine (SVM), boosted and bagged decision trees, k-nearest neighbor, Naïve Bayes, discriminant analysis, logistic regression, and neural networks. Common regression algorithms include linear model, nonlinear model, regularization, stepwise regression, boosted and bagged decision trees, neural networks, and adaptive neuro-fuzzy learning. Unsupervised learning finds hidden patterns or intrinsic structures in data and is used to draw inferences from datasets consisting of input data without labeled responses. Clustering is a common unsupervised learning technique. Common algorithms for performing clustering include k-means and k-medoids, hierarchical clustering, Gaussian mixture models, hidden Markov models, self-organizing maps, fuzzy c-means clustering, and subtractive clustering. In the context of self-driving automobiles, the controller circuit 102 can use machine learning specifically to determine, based on the weather data 104, the type or magnitude of precipitation that can affect the dynamic response of the vehicle 108 to ensure the controller circuit 102 can accurately select the calibration of the vehicle lateral-control features 118.

The weather data 104 received by the controller circuit 102 from the weather sources 106 can enable the controller circuit 102 to select calibrations that are appropriate for the current weather conditions. The controller circuit 102 can determine which attributes of the weather data 104 have a greatest impact on the lateral stability of the vehicle 108 and select calibrations improve steering performance.

Vehicle Sensors

Figure 3:
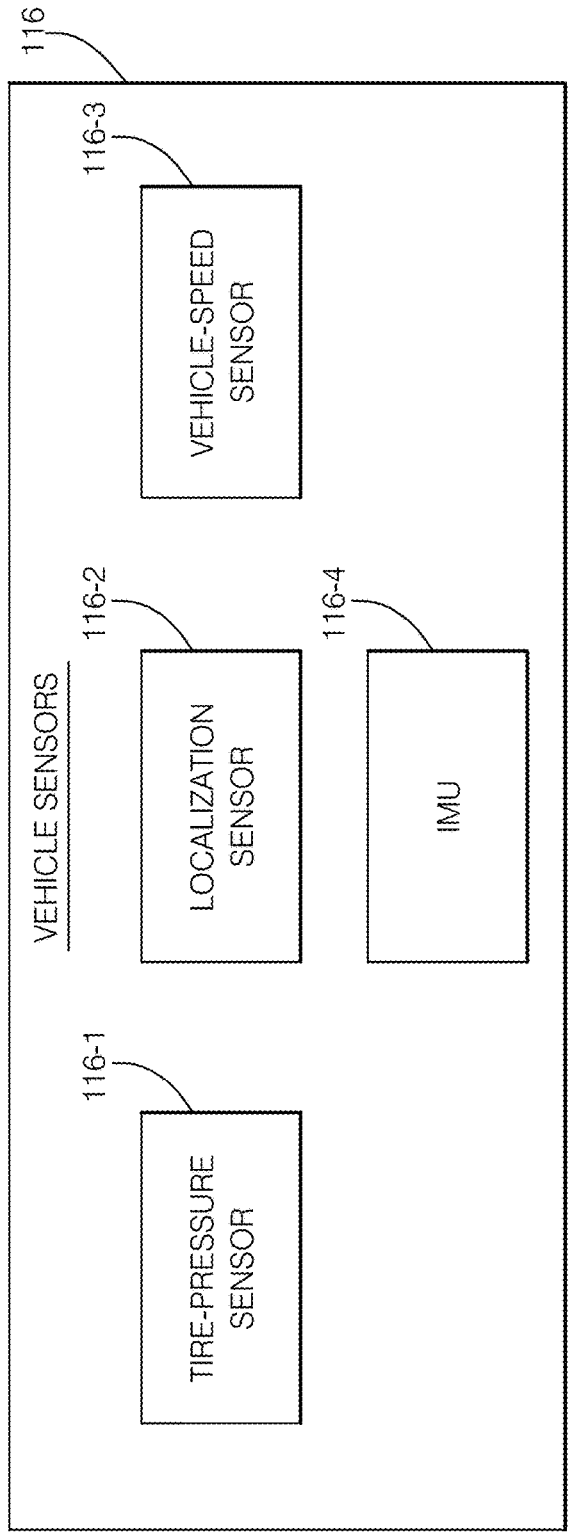
FIG. 3 illustrates an example of vehicle sensors of the vehicle lateral-control system with dynamically adjustable calibrations of FIG. 1.

FIG. 3 illustrates examples of the vehicle sensors 116 that are located remotely from the system 100. The vehicle sensors 116 generate the vehicle-state data 114 used by the controller circuit 102 to determine the current vehicle operating condition or vehicle state. The vehicle sensors 116 can include a tire-pressure sensor 116-1, a localization sensor 116-2, a vehicle-speed sensor 116-3, and an inertial measurement unit (IMU) 116-4.

The tire-pressure sensor 116-1 can be a direct tire-pressure sensor 116-1 or an indirect tire-pressure sensor 116-1 and can be components of the TPMS installed on the vehicle 108. The direct tire-pressure sensor 116-1 includes pressure transducers located inside each tire of the vehicle 108 that transmit pressure data to the TPMS, which reports it to the controller circuit 102 via the CAN bus. The indirect tire-pressure sensor 116-1 determines tire pressures using software-based systems using other sensor signals, for example, wheel speeds, accelerometers, or driveline data, to estimate and monitor the tire pressure without physical pressure-sensors installed inside the tires.

The localization sensor 116-2 can be a global navigation satellite system (GNSS). GNSS refers to a constellation of satellites that transmit signals from space that provide positioning and timing data to GNSS receivers located on the vehicle 108. The receivers then use this data to determine a location of the vehicle 108. GNSS provides positioning, navigation, and timing services on a global or regional basis. GPS, BeiDou, Galileo, and GLONASS, IRNSS, and QZSS are examples of GNSS operated by the USA, the People's Republic of China, the European Union, India, and Japan, respectively.

The vehicle-speed sensor 116-3 can be a rotational sensor (e.g., a wheel-speed sensor) where the signal may also be used to operate a speedometer of the vehicle 108. The vehicle-speed sensor 116-3 can also use data from the GNSS to determine the speed based on a change in positions of the vehicle 108.

The IMU 116-4 is an electronic device that detects a relative movement of the vehicle 108 and can include a yaw rate, a longitudinal acceleration, a lateral acceleration, a pitch rate, and a roll rate of the vehicle 108. The IMU 114-1 can use a combination of accelerometers and gyroscopes to detect a relative motion of the vehicle and can be a component of a dynamic control system installed on the vehicle 108.

The vehicle sensors 116 described above can provide vehicle-state data to the controller circuit 102 related to the lateral motion of the vehicle 108, and can be inputs to the vehicle dynamic model.

Vehicle Lateral-Control Features

The vehicle lateral-control features 118 can include the automatic lane-change control and lane-centering control. The controller circuit 102 can adjust the calibrations of the automatic lane-change control and lane-centering control and operate the vehicle 108 in the autonomous-driving mode based on the varying driving conditions indicated by the weather data 104, the image data 110, and the vehicle-state data 114. Adjusting the calibrations to suit the driving conditions can improve the stability of the vehicle, especially when operating in adverse conditions, for example, precipitation-covered roads or strong crosswinds because the calibration values affect the steering response of the vehicle 108.

The automatic lane-change control can be performed by the controller circuit 102 using a lateral-controller module in the software that plans and tracks a trajectory of the vehicle 108 during the lane-change. The calibrations of the automatic lane-change control can be provided to the lateral-controller module by the controller circuit 102. A model predictive controller (MPC) is an example of the lateral-controller module that can be used to track the trajectory and vehicle stability and constrain a range and rate of change of vehicle speed and steering angle during the automatic lane-change. The lane-centering control can also be performed using the MPC module to maintain the trajectory of the vehicle 108 within the lane. The calibrations of the automatic lane-change control and lane-centering control within the MPC module affect the lane-changing behavior and trajectory errors that can be influenced by the current driving conditions. While the examples below relate to the MPC module, other lateral-controller modules can be used, for example, a linear-quadratic regulator (LQR) controller or fused neural net controller.

Referring to the example of the MPC module, the calibrations for the automatic lane-change control and lane-centering control can be adjusted by the controller circuit 102 by selecting lateral-tuning parameters 124 from a memory of the controller circuit 102 that have been determined appropriate for specific driving conditions. The term, appropriate, as used herein is related to the lateral-tuning parameters, and refers to a resultant average lateral error determined over an accumulated distance, for example over 100 kilometers (km) of driving. The calibration can be considered appropriate when the average lateral error being less than ten centimeters (10 cm) from a planned trajectory of the vehicle 108 over the distance of 100 km. The lateral-tuning parameters can be predetermined during the vehicle-handling development process for multiple weather, road, and vehicle states and stored in the memory to be recalled by the controller circuit 102 at a later time when operating under similar conditions. The lateral-tuning parameters 124 can include predetermined weighting factors for a lateral-position error 124-1, a lateral-position-error rate 124-2, a heading error 124-3, a heading-error rate 214-4, and control moves 124-5. The predetermined weighting factors influence the dynamic control of the vehicle as determined by a dynamic model used in the MPC module. These weighting factors are determined during the vehicle-handling development, for example by the calibration engineer, and are used to create a smooth steering trajectory to a set point under varying driving conditions.

Figure 4:
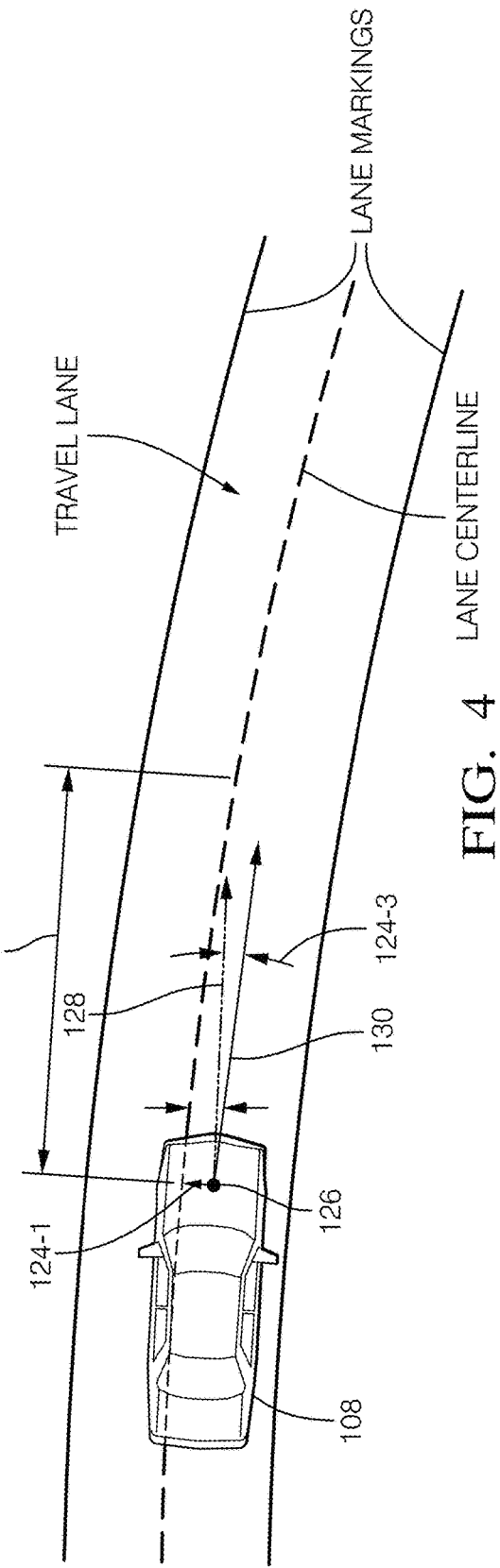
FIG. 4 illustrates an example of vehicle lateral-response data for a vehicle traveling on a roadway, in accordance with techniques of this disclosure.

FIG. 4 illustrates the vehicle 108 traveling in the travel lane of the roadway. The controller circuit 102 can determine a centerline of the travel lane based on the images of the lane markings captured by the camera 112, for example, by determining the width of the lane and placing the centerline in the geometric center of the lane. A vehicle center of gravity 126 (CG 126) is shown as a reference point for the position of the vehicle 108 relative to the lane. The vehicle heading 128 is the direction in which the CG 126 is moving, and the lane heading 130 is determined by the controller circuit 102 based on a tangent to a path of the lane or a curvature coefficient of the lane that is an inverse of a radius of curvature of the lane path. The path of the lane can be determined by the controller circuit 102 by applying a polynomial fit to the lane markings or the lane centerline. The lateral-position error 124-1 is a difference between an actual position of the CG 126 in the lane and the center of the lane, and the lateral-position-error rate 124-2 is a rate of change of the lateral-position error 124-1. The heading error 124-3 is an angle between the vehicle heading 128 and the lane heading 130, and the heading-error rate 124-4 is the rate of change of the heading error 124-3. The control moves 124-5 are used with the MPC process and represent a sequence of input changes to the model so that a predicted response moves to a set point in an appropriate manner. Other types of lateral-controller modules may exclude the control moves 124-5 from the calibrations.

A look-ahead distance (R) 132 is a longitudinal range where the vehicle 108 is expected to be in the future and is a factor in determining a lateral offset of the vehicle 108. The lateral offset can be determined by the lateral-controller module using the equation, $A_o+(A_1*R)+(A_2*R^2)+(A_3*R^3)$, where $A_o$ is the lateral-position error 124-1, $A_1$ is the heading error 124-3, $A_2$ is the curvature of the path, and $A_3$ is the curvature rate of the path.

The MPC can use the dynamic model of the vehicle 108, for example, a known bicycle model, to represent the lateral dynamic response of the vehicle 108 with respect to a steering angle. The MPC can use the bicycle model to predict a future response of the vehicle 108 during the automatic lane-change and lane-keeping control processes. The inputs to the dynamic model include the lateral-tuning parameters that include the predetermined weighting factors mentioned above that are stored in the memory of the controller circuit 102.

Figure 5:
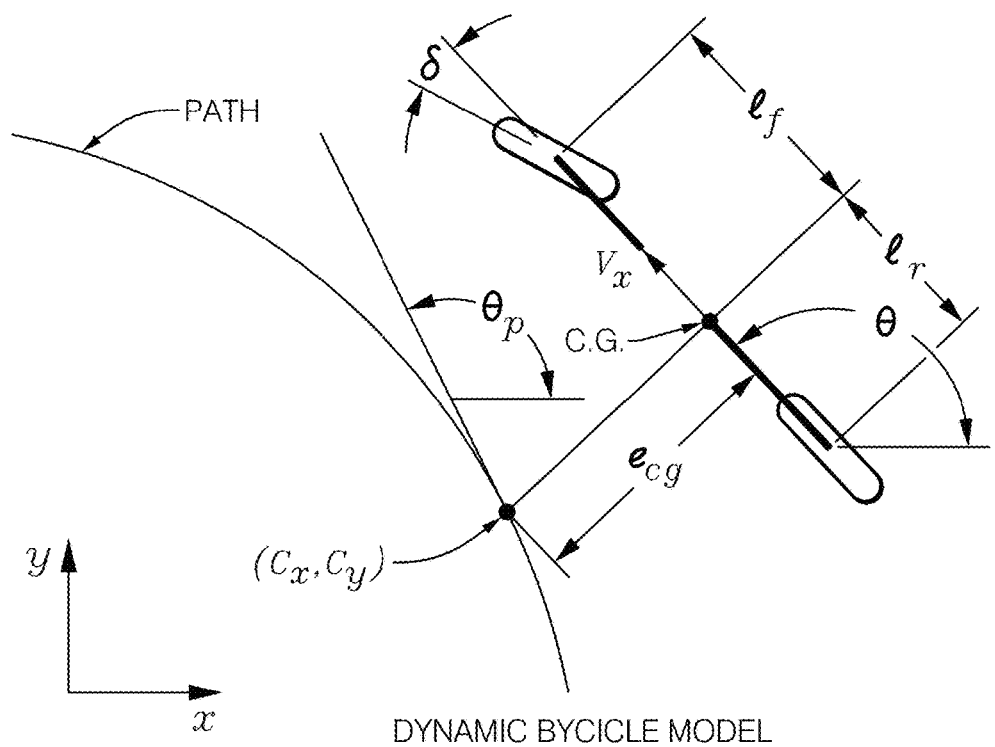
FIG. 5 illustrates an example of a dynamic bicycle model representative of the vehicle of FIG. 4, in accordance with techniques of this disclosure.

FIG. 5 illustrates a representation of the vehicle 108 following a lane path depicted by the bicycle model. The bicycle model lumps the two wheels of each axle into one wheel at a centerline of the vehicle. Distances from the CG 126 to the wheel centers are indicated by $l_f$ and $l_r$ and are known by the vehicle manufacturer. The steering angle is represented by the symbol $\delta$, and the lateral-position error 124-1 of the vehicle 108 relative to the lane path is indicated by the symbol $e_{cg}$. The vehicle heading 128 is represented by the symbol $\theta$, and the lane heading 130 is indicated by the symbol $\theta_p$. The velocity of the vehicle is represented by the symbol $v_x$. The bicycle model can be used to calculate the lateral response of the vehicle 108 with respect to the path of the lane. The MPC can then adjust the steering angle of the vehicle 108 so that the vehicle 108 follows the path of the lane or the trajectory determined for the automatic lane-change using the lateral-tuning parameters selected for the current driving conditions.

Data Attributes

The controller circuit 102 can determine attributes or specific characteristics of the weather data 104, image data 110, and vehicle-state data 114, and rank-order the attributes based on a magnitude of an effect of the attribute on the lateral control of the vehicle 108. The rank-ordering process can be predetermined based on experimental data. For example, the wind can have a greatest impact on the vehicle dynamics compared to other attributes, as the wind imparts forces on the vehicle that can affect the lateral dynamics Sunshine, or lack of sunshine, can affect the camera's ability to detect lane markings at various distances. For example, sunshine can saturate an imager of the camera reducing the camera's ability to detect lane markings, or nighttime operation can result in reduced detection of lane markings at distances farther away from the vehicle 108 compared to daytime driving. In another example, ice on the road may have a larger impact on vehicle dynamics when the vehicle is traveling on curved roads compared to straight roads. The rank-order can be determined via experimentation during the vehicle development process or can be learned by the controller circuit 102 using machine-learning routines, as described above. The examples of the attributes described below are not meant to be exhaustive and can vary depending on the vehicle-handling requirements and computational capacity of the controller circuit 102.

Examples of the attributes associated with the weather data 104 include precipitation, temperature, wind direction, and wind speed. The precipitation and temperature can affect a coefficient of friction between the road and the tires that can contribute to a lateral motion or cross slip of the vehicle 108. The temperature can also indicate whether ice can form on the roadway. The wind direction relative to the vehicle heading 128 can affect the stability of the vehicle 108 and can be treated as a disturbance or noise factor by the control system, and the wind speed is a magnitude of the force exerted on the vehicle 108.

Examples of the attributes associated with the image data 110 include a lane width, a curvature of the roadway, and an amount of ambient light. The lane width can be used to determine the lane centerline and to determine the lateral distance the vehicle 108 should traverse to complete the automatic lane-change. The curvature of the roadway can be used to determine the path of the lane or the lateral offset during the automatic lane-change. As described previously, operating the vehicle 108 in sunshine or darkness can affect the camera's 112 detection of lane markings. Other sources of ambient lighting, for example, streetlights, can also affect the detection of lane markings.

Examples of the attributes associated with the vehicle-state data 114 include the tire pressure, vehicle mass, vehicle heading, and vehicle speed. The tire pressure can affect a stiffness of the tire that affects the lateral motion of the vehicle 108. The stiffness of the tire can be an input to the bicycle model. The vehicle mass, heading, and speed can affect the dynamic response of the vehicle 108 and can also be inputs to the bicycle model. The vehicle mass can be known from the vehicle manufacturer's specifications or can be estimated based on a fuel level and number of passengers in the vehicle 108 that may be detected by an occupancy monitoring system installed in the vehicle 108.

Figure 6:
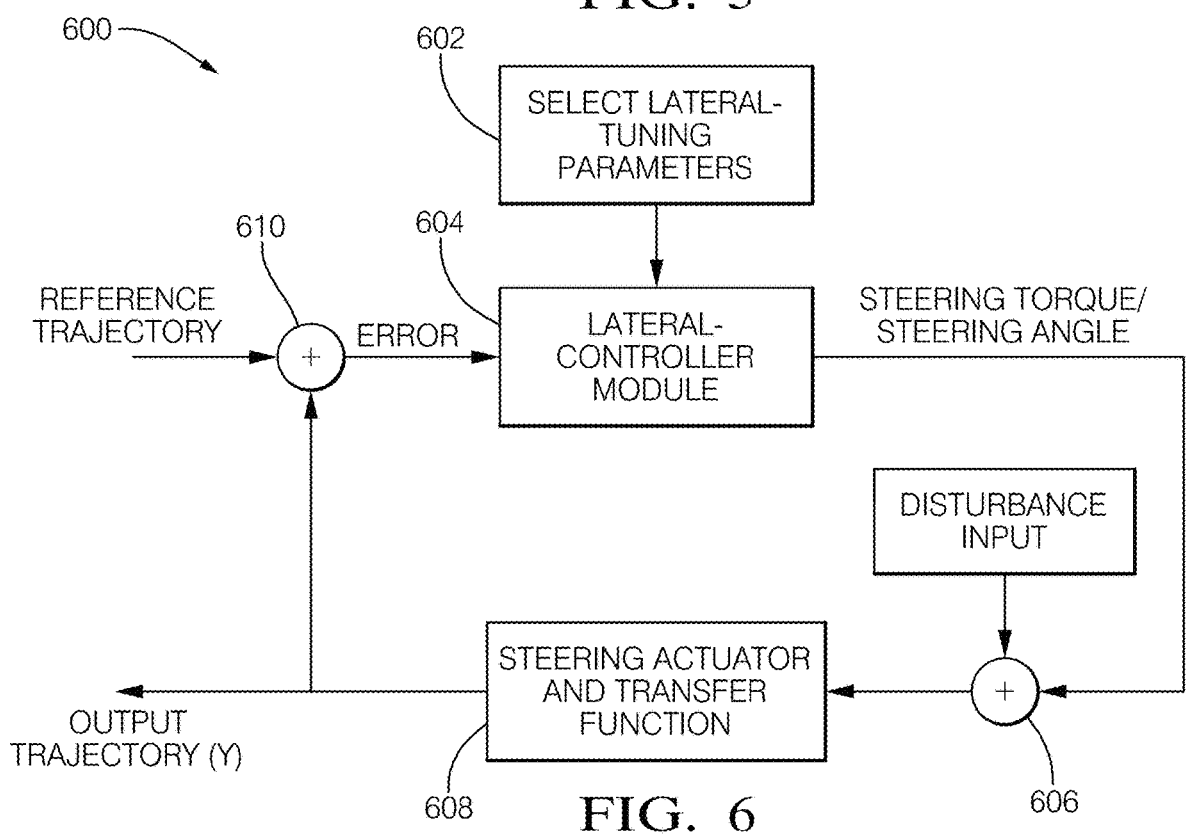
FIG. 6 illustrates an example lateral-control logic, in accordance with techniques of this disclosure.

FIG. 6 is a flowchart 600 illustrating an example of a control logic that can be performed by the controller circuit 102 to calculate a desired steering output for the vehicle 108. The control logic starts at 602 with selecting lateral-tuning parameters and ends at 610 with an error feedback. In this example, at 602, the controller circuit 102 selects the lateral-tuning parameters 120 from the memory that are determined to be appropriate for the current driving conditions based on the input data attributes. The lateral-tuning parameters 120 are fed to the lateral-controller module where, at step 604, the lateral-controller module determines a steering torque and steering angle for the vehicle 108.

At 606, disturbances on the vehicle are added to the output signal from the lateral-controller module, for example, the wind direction and wind speed or a road camber, that can affect the vehicle heading 128. The disturbances can be one or more of the attributes described above for the weather data 104, image data 110, and vehicle-state data 114.

At 608, a plant comprising a steering actuator and associated transfer function determine an output trajectory (Y) to control the vehicle heading 128, and at 610, the output trajectory is added to a reference trajectory to determine an error that is fed back to the lateral-controller module. The reference trajectory can be the path planned for the automatic lane-change or can be the current lane path determined for lane-keeping control.

The controller circuit 102 can adjust the calibration by selecting lateral-tuning parameters 124 associated with the one or more attributes from the memory of the controller circuit 102. The lateral-tuning parameters 124 can be accessed by the controller circuit 102 from look-up tables associated with multiple weather conditions, multiple roadway configurations, and multiple vehicle states.

The controller circuit 102 can store a rank-order of the attributes in the memory where the attribute having a largest effect on the vehicle dynamics is assigned a greatest priority or importance, with the other attributes being assigned importance in descending order. For the examples described in this disclosure, the wind is assigned the greatest importance, the road conditions are assigned a secondary importance, and an ambient lighting is assigned a tertiary importance. This rank-order can be determine based on empirical data and may be different for various vehicle applications.

The controller circuit 102 can adjust the calibration based on the attribute having the largest effect on the lateral control of the vehicle 108. For example, when the vehicle 108 is traveling during a relatively windy period, the controller circuit 102 can select the lateral-tuning parameters associated with the wind incident from a particular direction relative to the vehicle heading 128. In another example, when the vehicle 108 is traveling at a relatively high rate of speed, the controller circuit 102 can select the lateral-tuning parameters associated with high vehicle speed.

The controller circuit 102 can also adjust the calibration based on a predetermined combination or compounding of the attributes. For example, calibrations optimized for combinations of specific attributes from the weather data 104 and the image data 110 can be selected by the controller circuit 102 based on the actual detected conditions. FIG. 7 illustrates an example of lateral tuning calibrations that combine specific attributes with a defined rank-order determined through experimentation. In this example, the rank-ordering places the wind as having a greatest importance, the road condition as a secondary importance, and the ambient lighting as a tertiary importance. Combining or grouping the attributes together for an individual calibration can lead to a more robust calibration, as the attributes can be considered noise inputs to the vehicle response, and the resulting appropriate calibration can be more resistant or robust to the variation from the noise inputs.

Figure 8:
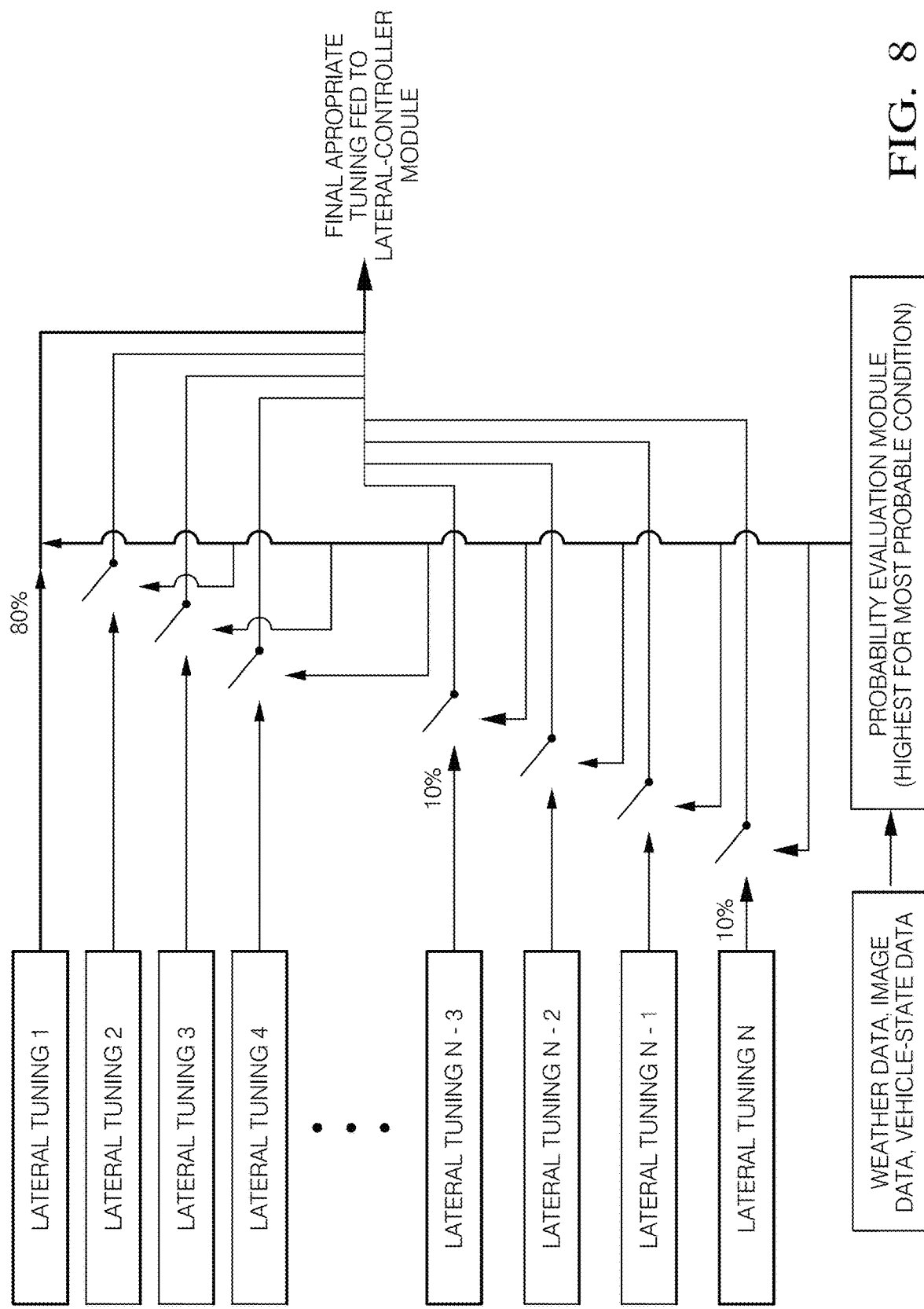
FIG. 8 illustrates an example of selecting appropriate calibrations of lateral-tuning parameters, in accordance with techniques of this disclosure.

FIG. 8 illustrates an example of the multiple calibrations for lateral tuning that are stored in the memory. FIG. 8 illustrates a portion of the possible calibrations and is not meant to be an exhaustive list. In this example, the calibrations are labeled from one to N and are associated with the combinations of attributes of the weather data 104, as illustrated in FIG. 7. For example, Lateral Tuning 1 is associated with a North-East wind, ice on the road, and direct sunlight. The controller circuit 102 can determine the final optimum tuning to be fed to the lateral-controller module by selecting the lateral tuning calibration that corresponds to the most probable attribute having the highest ranking.

The controller circuit 102 can evaluate which lateral tunings to select using a probability evaluation module in the software that assigns the highest weighting factors to the most probable conditions. In the example illustrated in FIG. 8, the weather data 104 received by the controller circuit 102 indicates an 80% probability of the North-East wind and 10% probabilities to two other wind directions associates with Lateral Tuning N-3 and Lateral Tuning N. The controller circuit 102 selects Lateral Tuning 1 that is associated with the North-East wind because the North-East wind has the highest probability of occurrence compared to other wind directions, and because the wind is considered the highest-ranking attribute. If, for example, zero wind was detected or forecast in the region traveled by the vehicle 108, the controller circuit 102 would determine the appropriate tuning calibration based on the attribute having the secondary importance, which in this example, is the ice on the road attribute.

Figure 9:
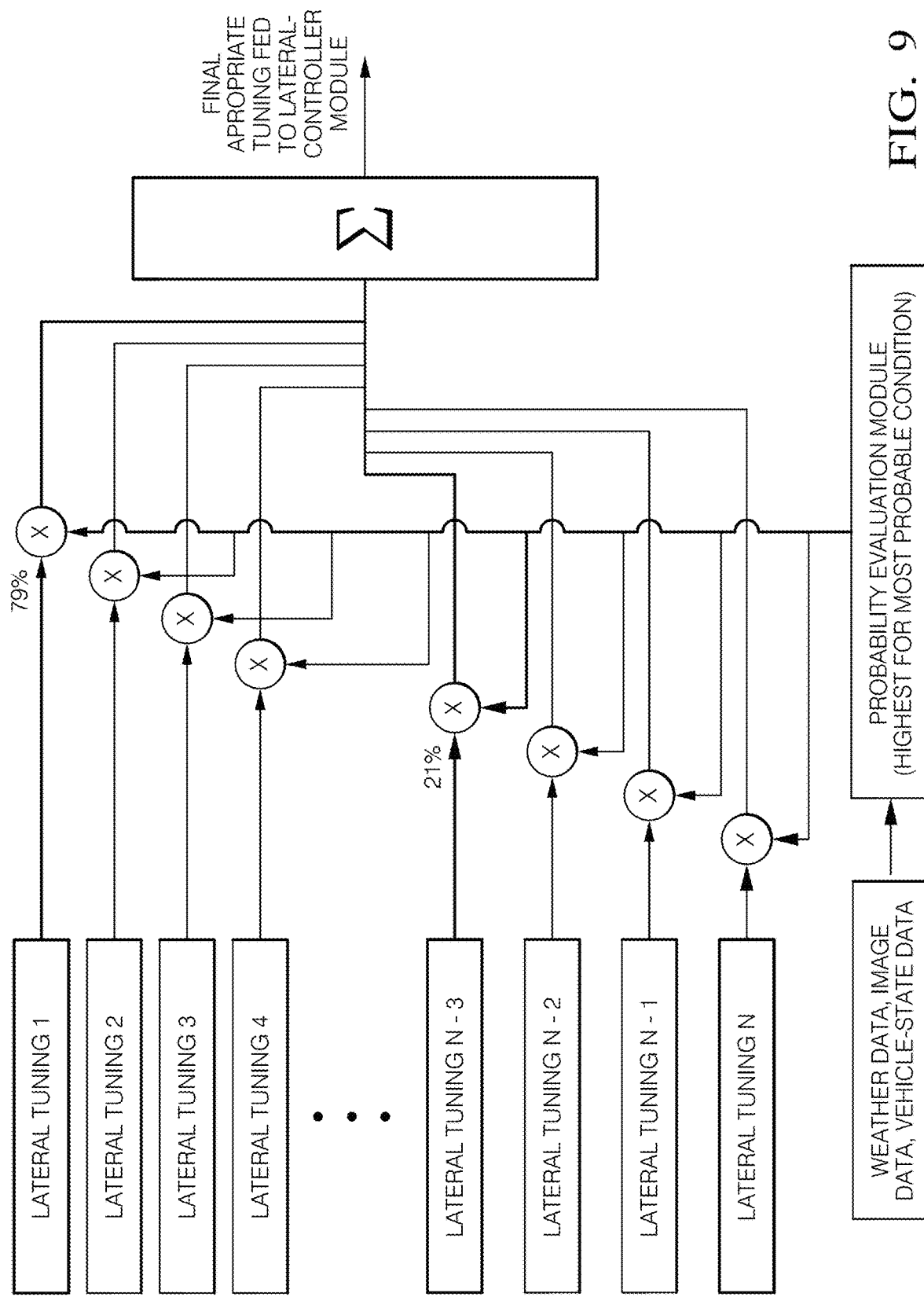
FIG. 9 illustrates another example of selecting appropriate calibrations of lateral-tuning parameters, in accordance with techniques of this disclosure.

FIG. 9 illustrates another example where the controller circuit 102 selects the lateral tunings based on a probabilistic method. The controller circuit 102 can evaluate which lateral tunings to select using the probability evaluation module in the software. In the example illustrated in FIG. 9, the controller circuit 102 can combine all the data sources for a particular attribute, for example, combine all the sources of wind data, and apply a predetermined trust factor that assigns a confidence or trust-level to the data source. The predetermined trust factor can be determined based on experimentation or by preference of the user. The controller circuit 102 can determine a resultant probability, $P_r$, that is a function of the trust factor, the attribute probability based on the input data, and the rank-order of the attribute.

Using an example of two sources of weather data 104 the resultant probability can be determined as shown in Table 1 below.

TABLE 1

| Probabilistic Determination of Tuning Calibration | | | |
|---|---|---|---|
| | WEATHER DATA SOURCE 1 | WEATHER DATA SOURCE 2 | COMBINED PROBABILITY |
| TRUST FACTOR | 90% | 10% | |
| WIND DIRECTION | 80% NORTH 20% NORTH-EAST | 70% NORTH 30% NORTH-EAST | |
| SUNSHINE | 90% SUN 10% CLOUDS | 100% SUN 0% CLOUDS | |
| WIND PROBABILITY | 0.9(0.8 N + 0.2 NE) + | 0.1(0.7 N + 0.3 NE) = | 0.79 N + 0.21 NE |
| SUN PROBABILITY | 0.9(0.9 S + 0.1 C) + | 0.1(1.0 S + 0.0 C) = | 0.96 S + 0.09 C |
| $P_{r1}$ | | 79% N, 96% SUN | |
| $P_{r2}$ | | 21% NE, 9% CLOUDS | |

The highest resultant probability, $P_1$, is determined to be 79% North wind and 96% sunshine. The next highest resultant probability, $P_{r2}$, is determined to be 21% North-East wind and 9% clouds. Referring back to FIG. 9, the lateral tunings are combined at 79% for Lateral Tuning 1 and 21% Lateral Tuning N-3 to generate the final appropriate lateral tuning fed to the lateral-controller module. In this example, Lateral Tuning 1 is associated with the North wind direction and Lateral Tuning N-3 is associated with the North-East wind direction. These calibrations can also include compounded attributes, similar to those shown in FIG. 7, and are selected for the wind direction due to the priority given to the wind direction by the controller circuit.

Figure 10:
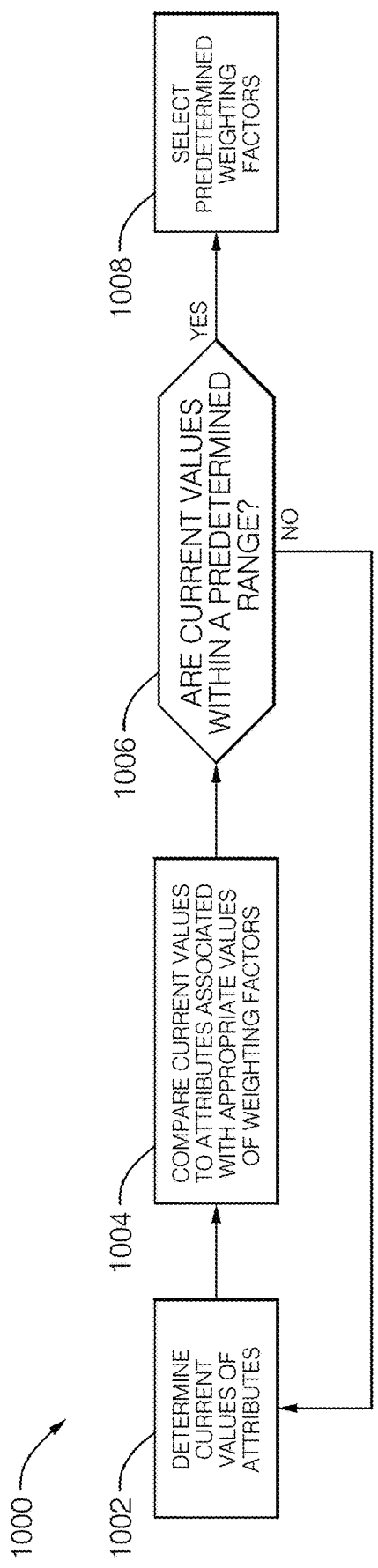
FIG. 10 illustrates an example logic flow of the vehicle lateral-control system with dynamically adjustable calibrations of FIG. 1.

FIG. 10 illustrates an example logic flow performed by the controller circuit 102 for selecting the calibration values from the memory of the controller circuit 102. The logic flow starts at 1002 with determining the current values of the attributes and ends at 1008 with selecting the predetermined weighting factors. In this example, at 1002, the controller circuit 102 determines the current values of the attributes based on the weather data 104, the image data 110, and the vehicle-state data 114. At 1004, the controller circuit 102 compares the current values to the attributes associated with appropriate values for the predetermined weighting factors that are stored in the memory. The appropriate values are predetermined values for the weighting factors that were determined during vehicle testing under various weather, road, and vehicle conditions. The appropriate values represent a suitable lateral-control setting for the vehicle under the associated test conditions, as described above. For example, automatic lane-change maneuvers are conducted on dry roads with wind from several directions, and the appropriate weighting factors are determined and stored in the memory and associated with the respective wind direction.

At 1006, the controller circuit 102 determines whether the current values are within a predetermined range of the attributes associated with the appropriate values. The predetermined ranges are established for each attribute, as the actual values may not exactly match the values of the attributes associated with the appropriate values. For example, the predetermined range for the wind direction can be plus or minus fifteen degrees of the wind direction used to establish the associated appropriate value (e.g., the North wind direction). The predetermined range for the vehicle speed can be plus or minus five kilometers per hour of the vehicle speed used to establish the associated appropriate value. Some of the attributes associated with the appropriate values may not have a predetermined range, for example, ice on the road is either present or absent.

If the current values are not within the predetermined range of the attributes associated with the appropriate values, the controller circuit 102 maintains the current calibration and returns to 1002. If the current values are within the predetermined range of the attributes associated with the appropriate values, at 1008, the controller circuit 102 selects the predetermined weighting factors associated with the attributes stored in the memory to be fed to the lateral-controller module module, as illustrated in FIG. 6.

To inhibit the system 100 from rapidly changing between calibrations that may introduce noise into the system 100 or create an erratic steering output or oscillations, the controller circuit 102 can operate the vehicle 108 with the adjusted calibration for a time exceeding a threshold, for example, in a range between fifteen minutes and sixty minutes after the calibration has been adjusted. The time threshold can vary based on the user requirements or the driving conditions. For example, the calibration selected by the controller circuit 102 for operating the vehicle 108 on wet roads can be maintained for sixty minutes beyond the time that the system 100 determines that the rain has stopped. The controller circuit 102 can then select a new calibration based on the detected conditions and operate the vehicle 108 using the new calibration for the time exceeding the threshold. In another example, the calibration selected for operating the vehicle 108 under crosswind conditions can be maintained for ten minutes beyond the time that the system 100 determines the crosswinds to have subsided.

Example Method

Figure 11:
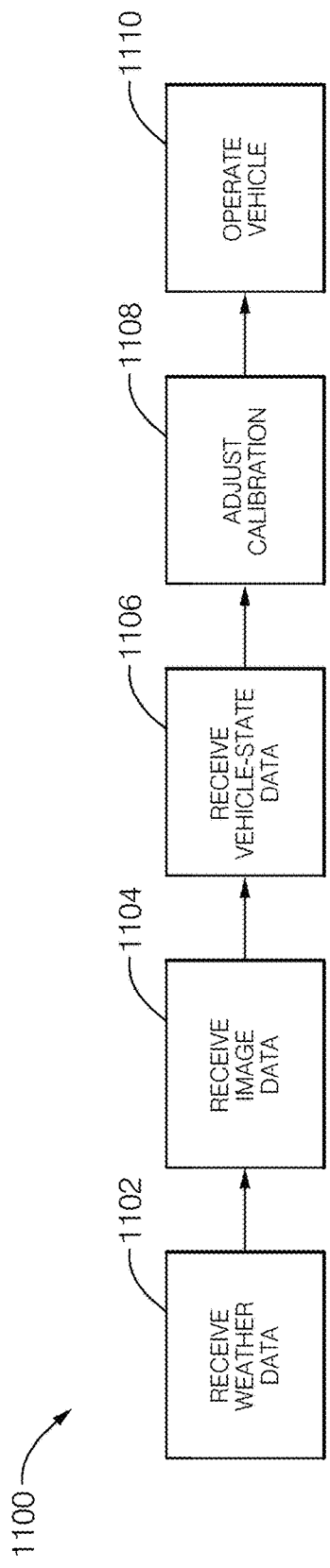
FIG. 11 is an example method of operating the example of the vehicle lateral-control system with dynamically adjustable calibrations of FIG. 1.

FIG. 11 illustrates example methods 1100 performed by the system 100. For example, the controller circuit 102 configures the system 100 to perform operations 1102 through 1110 by executing instructions associated with the controller circuit 102. The operations (or steps) 1102 through 1110 are performed but not necessarily limited to the order or combinations in which the operations are shown herein. Further, any of one or more of the operations may be repeated, combined, or reorganized to provide other operations.

Step 1102 includes RECEIVE WEATHER DATA. This can include the controller circuit 102 receiving weather data 104 from the weather information sources 106 for the geographic region traveled by a vehicle 108, as described above. Attributes of the weather data 104 can include precipitation, temperature, wind direction, and wind speed. The weather information sources 106 can include the cellular network 106-1, the satellite network 106-2, the V2I network 106-3, weather applications 106-4, the vehicle radar sensor 106-5, other vehicle cameras 106-6, and the camera 112. The controller circuit 102 can extract specific weather information from the weather data 104 using known data-querying techniques, for example wind speed and direction, temperature, or precipitation that can be used to adjust the calibrations of the lateral-control features, as described above.

Step 1104 includes RECEIVE IMAGE DATA. This can include the controller circuit 102 receiving image data 110 from the camera 112 of the roadway traveled by the vehicle 108, as described above. The camera 112 can be an ADAS component that can detect lane markings, lane boundaries, or objects proximate to the vehicle 108, and the controller circuit 102 can classify and identify the objects in the images using known software techniques. The camera 112 can also be used as one of the weather information sources 106, as described above.

Step 1106 includes RECEIVE VEHICLE-STATE DATA. This can include the controller circuit 102 receiving the vehicle-state data 114 from vehicle sensors 116, indicating the operating condition of the vehicle 108 on the roadway, as described above. The vehicle-state data 114 can include data for current vehicle operating conditions that have a significant impact on the dynamic response of the vehicle based on the known vehicle dynamic model. The vehicle-state data 114 can include the tire pressure, the vehicle location, the vehicle speed, and the relative motion of the vehicle 108.

Step 1108 includes ADJUST CALIBRATION. This can include the controller circuit 102 adjusting the calibration of the vehicle lateral-control features 118 that include the automatic lane-change and lane-keeping. The controller circuit 102 adjusts the calibrations based on the attributes of the weather data 104, the image data 110, or the vehicle-state data 114, to increase passenger comfort or reduce an error from a lane centerline when operating the vehicle in the autonomous-driving mode, as described above.

The controller circuit 102 can adjust the calibrations for the automatic lane-change control and lane-centering control by selecting lateral-tuning parameters 124 from the memory of the controller circuit 102 that have been determined to be appropriate for specific driving conditions. The lateral-tuning parameters 124 can include predetermined weighting factors for the lateral-position error 124-1, the lateral-position-error rate 124-2, the heading error 124-3, the heading-error rate 214-4, and control moves 124-5, as described above. The controller circuit 102 can rank-order the attributes based on the magnitude of the effect of the attribute on the lateral control of the vehicle, as described above. The lateral-tuning parameters 124 can be selected based on a single attribute or a combination of attributes, as described above.

The controller circuit 102 can determine a predicted vehicle response using the dynamic vehicle model based on the current values of the attributes and can select the lateral-tuning parameters 124 based on the largest predicted vehicle response. The controller circuit 102 can determine whether the current values of the attributes are within a predetermined range of the attributes associated with the appropriate values and select the predetermined weighting factors based on the current values for the attributes, as described above.

Step 1110 includes OPERATE VEHICLE. This can include the controller circuit 102 operating the vehicle 108 in the autonomous-driving mode based on the adjusted calibration, as described above. The controller circuit 102 can operate the vehicle 108 based on the first adjusted calibration for the time exceeding a threshold to inhibit rapid calibration changes that can introduce error into the system 100 or create erratic steering. The controller circuit 102 can determine that the driving conditions have changed and select the second adjusted calibration different from the first adjusted calibration. The controller circuit 102 can then operate the vehicle 108 based on the second adjusted calibration for the time exceeding the threshold, as described above.

EXAMPLES

In the following section, examples are provided.

Example 1. A system comprising a controller circuit configured to: receive, from one or more weather information sources, weather data for a geographic region traveled by a vehicle; receive, from a camera, image data of a roadway traveled by the vehicle in the geographic region; receive, from one or more vehicle sensors, vehicle-state data indicating an operating condition of the vehicle on the roadway in the geographic region; adjust, based on one or more of the weather data, the image data, and the vehicle-state data, a calibration of one or more vehicle lateral-control features to increase passenger comfort or reduce an error from a lane centerline; and operate the vehicle on the roadway based on the adjusted calibration.

Example 2. The system of the previous example, wherein the controller circuit is further configured to determine one or more attributes of the weather data, the image data, and the vehicle-state data, and rank-order the attributes based on a magnitude of an effect of the attribute on a lateral control of the vehicle.

Example 3. The system of any of the previous examples, wherein the controller circuit is further configured to adjust the calibration by selecting lateral-tuning parameters associated with the one or more attributes from a memory of the controller circuit.

Example 4. The system of any of the previous examples, wherein attributes of the weather data include one or more of a precipitation, a temperature, a wind direction, and a wind speed.

Example 5. The system of any of the previous examples, wherein attributes of the image data include a lane width and a curvature of the roadway.

Example 6. The system of any of the previous examples, wherein attributes of the vehicle-state data include one or more of a tire pressure, a vehicle mass, a vehicle heading, and a vehicle speed.

Example 7. The system of any of the previous examples, wherein the controller circuit is further configured to adjust the calibration based on the attribute having a largest effect on the lateral control.

Example 8. The system of any of the previous examples, wherein the controller circuit is further configured to adjust the calibration based on the rank-order of the attributes.

Example 9. The system of any of the previous examples, wherein the controller circuit is further configured to adjust the calibration based on values from look-up tables associated with a plurality of weather conditions, a plurality of roadways, and a plurality of vehicle states.

Example 10. The system of any of the previous examples, wherein the one or more vehicle lateral-control features include an automatic lane-change control and a lane-centering control.

Example 11. The system of any of the previous examples, wherein the weather information sources include a cellular network, a vehicle-to-infrastructure network, weather applications, a vehicle radar sensor, and the camera.

Example 12. The system of any of the previous examples, wherein the controller circuit is further configured to operate the vehicle based on the adjusted calibration for a time exceeding a threshold.

Example 13. A method, comprising receiving, with a controller circuit, weather data from one or more weather information sources for a geographic region traveled by a vehicle; receiving, image data from a camera of a roadway traveled by the vehicle in the geographic region; receiving, vehicle-state data from one or more vehicle sensors indicating an operating condition of the vehicle on the roadway in the geographic region; adjusting, based on one or more of the weather data, the image data, and the vehicle-state data, a calibration of one or more vehicle lateral-control features to increase passenger comfort or reduce an error from a lane centerline; and operating the vehicle on the roadway, based on the adjusted calibration.

Example 14. The method of the previous example, further comprising determining, with the controller circuit, one or more attributes of the weather data, the image data, and the vehicle-state data, and rank-ordering the attributes based on a magnitude of an effect of the attribute on a lateral control of the vehicle.

Example 15. The method of any of the previous examples, further comprising adjusting, with the controller circuit, the calibration by selecting lateral-tuning parameters associated with the one or more attributes from a memory of the controller circuit.

Example 16. The method of any of the previous examples, wherein the lateral-tuning parameters include predetermined weighting factors for one or more of a lateral-position error, a lateral-position-error rate, a heading-error, a heading-error rate, and control moves.

Example 17. The method of any of the previous examples, wherein the predetermined weighting factors include appropriate values associated with each of the one or more attributes, further comprising determining, with the controller circuit, current values for the one or more attributes; determining, whether the current values are within a predetermined range of the attributes associated with the appropriate values; and selecting, the predetermined weighting factors based on the current values for the one or more attributes.

Example 18. The method of any of the previous examples, further comprising determining, with the controller circuit based on a dynamic vehicle model, a predicted vehicle response based on the current values of the one or more attributes; and selecting the lateral-tuning parameters based on a largest predicted vehicle response.

Example 19. The method of any of the previous examples, further comprising selecting, with the controller circuit, the predetermined weighting factors based on one of a single attribute and a combination of attributes.

Example 20. The method of any of the previous examples, further comprising operating the vehicle based on a first adjusted calibration, with the controller circuit, for a time exceeding a threshold; determining, that a driving condition has changed; and operating the vehicle based on a second adjusted calibration different from the first adjusted calibration.

Conclusion

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A system comprising:
 a controller circuit configured to:
  receive, from one or more weather information sources, weather data for a geographic region traveled by a vehicle;
  receive, from a camera, image data of a roadway traveled by the vehicle in the geographic region;
  receive, from one or more vehicle sensors, vehicle-state data indicating an operating condition of the vehicle on the roadway in the geographic region;
  determine one or more attributes of the weather data, the image data, and the vehicle-state data, and rank-order the attributes based on a magnitude of an effect of the attribute on a lateral control of the vehicle, the attributes of the image data comprising a lane width and a curvature of the roadway;
  adjust, based on the rank-ordering of the attributes of the weather data, the image data, and the vehicle-state data, a calibration of one or more parameters of an automatic lane-change control, the parameters configured to influence steering trajectories of the automatic lane-change control; and
  operate the vehicle on the roadway based on the adjusted calibration.

2. The system of claim 1, wherein the controller circuit is further configured to adjust the calibration by selecting parameters associated with the one or more attributes from a memory of the controller circuit.

3. The system of claim 1, wherein attributes of the weather data include one or more of a precipitation, a temperature, a wind direction, and a wind speed.

4. The system of claim 1, wherein attributes of the vehicle-state data include one or more of a tire pressure, a vehicle mass, a vehicle heading, and a vehicle speed.

5. The system of claim 1, wherein the controller circuit is further configured to adjust the calibration based on the attribute having a largest effect on the lateral control.

6. The system of claim 1, wherein the controller circuit is further configured to adjust the calibration based on the rank-order of the attributes.

7. The system of claim 1, wherein the controller circuit is further configured to adjust the calibration based on values from look-up tables associated with a plurality of weather conditions, a plurality of roadways, and a plurality of vehicle states.

8. The system of claim 1, wherein the weather information sources include a cellular network, a vehicle-to-infrastructure network, weather applications, a vehicle radar sensor, and the camera.

9. The system of claim 1, wherein the controller circuit is further configured to operate the vehicle based on the adjusted calibration for a time exceeding a threshold.

10. The system of claim 1, wherein the rank-ordering is based on empirical data for the vehicle.

11. A method comprising:
 receiving, with a controller circuit, weather data from one or more weather information sources for a geographic region traveled by a vehicle;
 receiving, image data from a camera of a roadway traveled by the vehicle in the geographic region;
 receiving, vehicle-state data from one or more vehicle sensors indicating an operating condition of the vehicle on the roadway in the geographic region;
 determine one or more attributes of the weather data, the image data, and the vehicle-state data, and rank-order the attributes based on a magnitude of an effect of the attribute on a lateral control of the vehicle, the attributes of the image data comprising a lane width and a curvature of the roadway;
 adjusting, based on the rank-ordering of the attributes of the weather data, the image data, and the vehicle-state data, a calibration of one or more parameters of a lane-centering control, the parameters configured to influence steering trajectories of the lane-centering control; and
 operating the vehicle on the roadway, based on the adjusted calibration.

12. The method of claim 11, further comprising:
 adjusting, with the controller circuit, the calibration by selecting parameters associated with the one or more attributes from a memory of the controller circuit.

13. The method of claim 12, wherein the parameters comprise predetermined weighting factors for one or more of a lateral-position error, a lateral-position-error rate, a heading-error, a heading-error rate, and control moves.

14. The method of claim 13, wherein the predetermined weighting factors comprise appropriate values associated with each of the one or more attributes, the method further comprising:
 determining, with the controller circuit, current values for the one or more attributes;
 determining, whether the current values are within a predetermined range of the attributes associated with the appropriate values; and
 selecting, the predetermined weighting factors based on the current values for the one or more attributes.

15. The method of claim 14, further comprising:
 determining, with the controller circuit based on a dynamic vehicle model, a predicted vehicle response based on the current values of the one or more attributes; and
 selecting the lateral-tuning parameters based on a largest predicted vehicle response.

16. The method of claim 13, further comprising:
 selecting, with the controller circuit, the predetermined weighting factors based on one of a single attribute and a combination of attributes.

17. The method of claim 12, further comprising:
 operating the vehicle based on a first adjusted calibration, with the controller circuit, for a time exceeding a threshold;
 determining, that a driving condition has changed; and
 operating the vehicle based on a second adjusted calibration different from the first adjusted calibration for the time exceeding the threshold.

18. The method of claim 11, wherein
attributes of the weather data include one or more of a precipitation, a temperature, a wind direction, and a wind speed.

19. The method of claim 11, wherein attributes of the vehicle-state data include one or more of a tire pressure, a vehicle mass, a vehicle heading, and a vehicle speed.

20. The method of claim 11, wherein the rank-ordering is based on empirical data for the vehicle.

\* \* \* \* \*